Jan. 26, 1932.   R. S. SCOTT   1,842,846
AIRCRAFT
Filed May 13, 1930
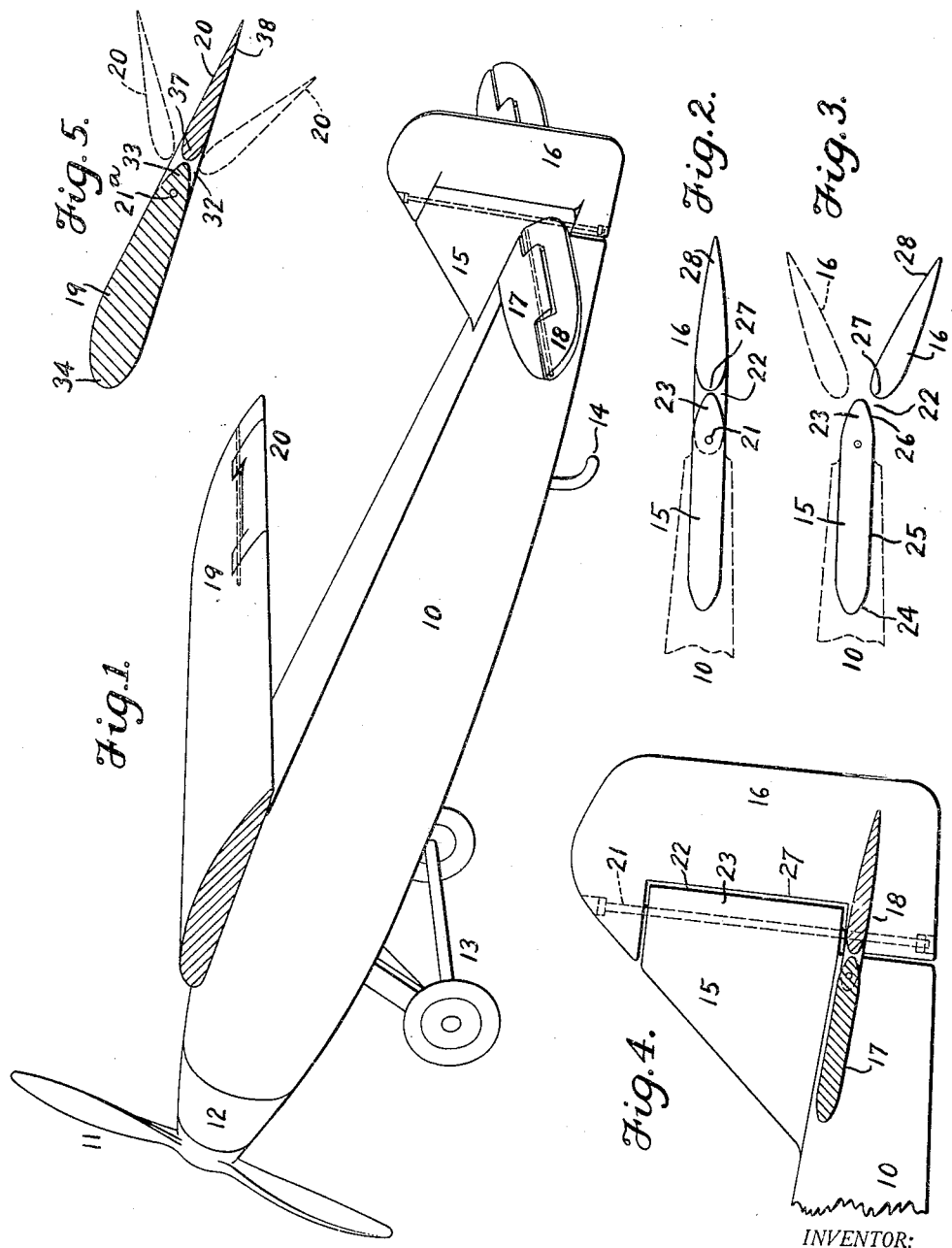
INVENTOR:
Rossiter S. Scott,
BY
Morrison, Kennedy & Campbell,
ATTORNEYS.

Patented Jan. 26, 1932

1,842,846

UNITED STATES PATENT OFFICE

ROSSITER S. SCOTT, OF NEW YORK, N. Y.

AIRCRAFT

Application filed May 13, 1930. Serial No. 451,950.

This invention relates to an aircraft and is applicable to various types of aircraft including dirigible balloons, although herein illustratively shown as applied to an airplane. The invention pertains more particularly to improvements in the controlling or sustaining surfaces or devices of aircraft, typically represented by steering devices, rudders and elevators, and by wings or sustaining surfaces provided with controlling portions or ailerons.

The general objects of the present invention are to improve the efficiency of control of aircraft through steering devices, ailerons and the like, to increase the promptness and effectiveness of response to control, and insure an adequate reaction force on the control elements, thereby improving the capacity and performance of the aircraft, and particularly enabling effective and safe control at lower travel speeds than with ordinary control means, and turning movements of the craft without excessive reduction of speed. Further objects include minimizing the drag and therefore resistance to flight during times of steering or other control and thereby the general stresses in the aircraft, and to afford a highly compact and durable means of control.

With the usual form of steering or control means there is an excessive strain upon the control members, especially in high winds, and in the case of airplanes during climbing, diving and turning; and it is a particular object hereof to reduce such strains, more especially by minimizing the eddying which is apt to occur adjacent to the control member or rudder when in operation, and the resulting pressures and torque upon the devices.

Other objects and advantages of the present invention will be explained in the hereinafter following description of an illustrative embodiment thereof or will be understood by those skilled in the subject.

To the attainment of such objects and advantages the present invention consists in the novel aircraft, or control means for aircraft, and the novel features of operation, combination, construction and detail herein illustrated or described.

In the accompanying drawings Fig. 1 is a perspective view of an aircraft embodying the present invention, the airplane being taken as an illustration, one half of the sustaining surface or wing however being omitted for compactness of illustration.

Fig. 2 is a somewhat diagrammatic edge view of a control device or means embodying the invention, the forward and aft portions or members of which are shown in longitudinal alinement in the direction of flight, which may be considered the normal relative position, and the combined portions or members being hereinafter referred to for convenience as constituting an airfoil, one portion of which is swingable relatively to the other.

Fig. 3 is a view similar to Fig. 2, but showing in full lines the trailing or aft portion or member of the airfoil of Fig. 2 swung out to one side or controlling position and in dotted lines the same member swung out to the opposite side of the normal.

Fig. 4 is a side elevation of the rear end of the airplane of Fig. 1 showing especially the rudder for right and left steering and the elevator, which is merely for up and down steering, both of these embodying the principles as disclosed in Figs. 2 and 3.

Fig. 5 is a fore-and-aft vertical section taken through the wing and aileron of Fig. 1 and showing one mode in which the principles of Figs. 2 and 3 may be applied to a wing and aileron.

Referring first to the general elements of the aircraft there is shown, in conventional form, a fuselage 10 and at its forward end a propeller 11 driven by a motor 12. Underneath is shown the usual landing gear 13 and near the tail end a skid 14.

For right and left steering there is shown a vertical fin 15 and hinged at the rear of it a rudder 16, these combined elements 15 and 16 cooperating to constitute a controlling or steering device, and the two members constituting in effect an airfoil, the trailing portion 16 of which is swingable relatively to the leading portion 15 either into longitudinal alinement or to an angle therewith at either side of such alinement.

For up and down steering there is also shown a fin or stabilizer surface 17 to the rear of which is hinged an elevator 18, these combined elements 17 and 18 constituting a controlling or steering device or airfoil corresponding to the rudder combination 15, 16.

Being an airplane, there is also shown a wing 19 at one side, it being understood that a symmetrically identical wing is to be provided at the other side, the wing at each side having a control device or aileron 20, and the combined members 19 and 20 constituting an airfoil on the principles already mentioned.

The control members of this invention, including rudder, elevators and ailerons, may be actuated by any practical control system such as the Depardussin or the simple stick control system.

In one aspect the present improvement may be described as constructing the trailing portion of any one of the described airfoils, 15, 16, or 17, 18, or 19, 20, with a substantial aperture adapted to form a through air passage adjacent to the line of connection of the two members, when the hinged trailing member is swung out to either side of alinement or normal position. Thus the aperture is dual functioning in relation to either side of trailing portion. Instead of the surface of the swinging member being carried clear forward to the axis of swinging it is constituted with the described aperture or opening at its forward part, preferably just aft of the axis of swinging. Preferably further, when the two members are in alinement the opening is substantially closed by the fact that the leading member is formed with a lip or extension aft of the axis and occupying the opening. The purpose and operation of this arrangement will be more fully explained after description of the details of construction.

Taking the rudder as an example intended to include the other controlling devices, the trailing portion 16 is shown hinged to the leading portion 15 by means of a pivot or axle 21. To the rear of the axis of swinging the trailing portion or member 16 is shown cut away with a substantial aperture 22. Instead of a single aperture the principles may be carried out by the employment of two or more substantial apertures; for example the rudder might be symmetrically duplicated and an aperture 22 provided at each side. In fact the present invention may be applied to rudders or other control devices of any known or desired design type or construction; for example a control device embodying this invention may have the swinging trailing portion constructed with an extension forward of the axis of swinging, tending to swing out to the opposite side and thus tend to give a balancing of stresses, on known principles. With this invention the rudder area may be placed substantially entirely longitudinally behind the fin to which it is hinged, rather than largely offset to one side.

The leading portion of the airfoil is shown with a lip or projection 23 extending aft of the axis and adapted to occupy the aperture 22 when the members are in alinement as shown in Fig. 2, whereas when the trailing member of the airfoil is swung substantially to either side, as in Fig. 3, the aperture will be seen to form a through air passage adapted to conduct air from either side of the airfoil to the opposite side.

The rigid member 15 is shown as formed with a rounded nose 24 constituting the leading edge of the airfoil 15, 16, or it may have substantially parallel sides 25, and its rear edge may be tapered as at 26. Complementarily the trailing member 16 is shown with a rounded nose or leading edge 27 at the rear side of the aperture 22, and the rear end of the member is tapered at 28, this member preferably having a streamline form.

The described structure of rudder may substantially be applied to the elevator or other control device. For example in Fig. 5 the wing 19 is shown as connected by a hinge 31 with aileron 20. The aileron is formed with an aperture 32 cut away at its forward part while the wing has an extension 33 normally occupying such aperture. The wing is shown with the usual rounded nose or leading edge 34, and the aileron with a corresponding rounded nose 37, and the aileron being of streamline form has its rear end tapered at 38. In general, it is preferable that the leading or entering edges of all members of airfoils in this invention shall be of rounding form so as to minimize head resistance and to function more advantageously where deflection of air is a purpose. In referring to the dual functioning aperture formed at the forward part of the trailing portion or member, in any embodiment it is intended to cover such an aperture, or apertures, formed in any manner or by any design; for example it may consist merely of a gap between the forward edge of the trailing portion and its hinge line or axis, with of course structural pieces or metal strips connecting the swinging traveling portion to the hinge or axle.

By the described improvement the control devices or surfaces of aircraft have been so constructed that when in action and in flight an organized suction force on one side of the trailing portion is usefully provided and enhanced for a given area of surface. The aperture 22, well shown in Fig. 3, constitutes a through air passage between the part 23 of the leading portion and the nose 27 of the trailing portion of the airfoil, and is in the nature of a nozzle. The nose 27 is adapted to divide the incident air stream and deflect a substantial part of it through the aperture 22 so that it will travel rearwardly as a forceful air stream over either surface of the rear member in a manner organized to insure a substantial suction action on that selected surface; the suction force so produced on either side of the rear member and the pressure force acting upon the side opposite to the suction side of the rear member, allows both suction and pressure forces to substantially cooperate and give a total force which increases the controlling action and value of the control devices for a given area of control surface with a reduction in drag.

The through passage is forward of the nose 27 of the swinging member 16, and between such nose and the axis of swinging. The tapered portion 26 of the member 15 might in some cases be omitted, with similar results, but the complete embodiment of this invention, and the best results preferably require the cooperating tapered portion or lip 26 and the rounding nose 27, the two forming the through air passage or nozzle, which may be substantially of Venturi form. The deflected portion of the air stream passes forcibly through the aperture or nozzle to create a negative pressure as a reliable and substantial suction force, as described. The steering or other action therefore is accomplished by a combination of push and pull, the air pressure at the outer side of the swinging member 16 affording a strong lateral push or positive pressure, and the suction at its inner side a strong negative pressure or pull, the two acting in cooperation to provide an increased steering force for a given area of surface, when the member 16, 18 or 20 is swung out to one side of normal so that its rounding nose is exposed to the incident air stream.

Additionally the described arrangement has the advantage of obviating the substantially closed angle or vertex usually embodied in control devices, for example when the swing trailing part of the combination is extended clear forward to the axis of swinging. The usual arrangement tends to create eddies at the vertex, with consequent strains, and reduction of control effect.

With the novel arrangement of this invention, due to its greater effectiveness, the angle to which the trailing portion is swung may be reduced. This reduction of control angle minimizes the drag or resistance to forward travel, which is of special importance at times of danger due to travel at slow speed. The present invention affords great efficiency of steering or control on account of the forcefulness of the combined push and pull on the swung member with reduced drag, whether it is swung to one side or to the other.

In the case of a wing and aileron, as in Fig. 5, the invention has the advantage of minimizing the dangers of stalling and spins. When flying an airplane on a turn, with present controlling devices, the down swung aileron, if at a considerable angle with the wing, may present so much aileron drag or obstruction to the incident air stream as to act as a brake due to its excessive exposure to the rush of air striking it. The air being somewhat over-pocketed at the hinge position, and under comparatively strong pressure in the vertex of the angle between wing and aileron, with the aircraft in flight, adds to the braking effect of the down-swung aileron, which causes the up-swung aileron and that wing end to travel faster and to gain relatively in lift, so that the airplane is likely to pivot about the down aileron wing end and thus tend to go into a spin if near the stalling angle. This danger is greatly reduced by the present invention owing to the permitted reduction of aileron angle and reduction of drag. The action of the present steering device affords a superior balance between the effect of the down-swung and up-swung ailerons in securing this advantage, particularly because of the reduced drag from the down aileron on the turns.

An aircraft has thus been described comprising airfoils each embodying the principles and attaining the objects of the present invention. Since various matters of operation, combination, construction and detail may be modified without departing from the principles, it is not intended to limit the invention to such matters except so far as set forth in the appended claims.

What is claimed is:

1. In an aircraft, an airfoil comprising a leading portion and a connected trailing portion, an axle extended through both portions so that the trailing portion may swing into longitudinal alinement with the leading portion or to an angle therewith at either side, the leading portion having part of its operative surface extended substantially rearward of the axle, and the trailing portion formed with a substantial aperture accommodating such extended part of the leading portion, and with a plurality of parts of its operative surface extended forward at least as far as said axle.

2. In an aircraft, an airfoil comprising a leading portion and a connected trailing portion, an axle extended through both portions so that the trailing portion may swing into longitudinal alinement with the leading portion or to an angle therewith at either side, the leading portion having part of its operative surface extended substantially rearward of the axle, and the trailing portion formed with a substantial aperture accommodating such extended part of the leading portion, and with a plurality of parts of its operative surface extended forward substantially beyond said axle.

3. An airfoil as in claim 1 and wherein both the leading and trailing portions have rounded edges at their points of nearest approach, constituting a tapered-flared air nozzle when the trailing portion is swung away from alinement.

4. In an aircraft, an airfoil comprising a leading portion and a connected trailing portion, an axle connecting both portions so that the trailing portion may swing into longitudinal alinement with the leading portion or to an angle therewith at either side, the leading portion having part of its operative surface extended substantially rearward of the axle, and the trailing portion formed with a substantial aperture accommodating such extended part of the leading portion and both portions having rounded edges which, when the trailing portion is swung out, form a nozzle having a restricted throat, with tapered approach to the throat and flaring form at both sides beyond the throat.

In testimony whereof this specification has been duly signed by:

ROSSITER S. SCOTT.